United States Patent [19]
Hoareau

[11] 3,915,468
[45] Oct. 28, 1975

[54] SNOW BIKE

[75] Inventor: Reynald L. Hoareau, St. Leonard, Montreal, Canada

[73] Assignee: The Raymond Lee Organ. Inc., New York, N.Y. ; a part interest

[22] Filed: Aug. 13, 1974

[21] Appl. No.: 496,985

[52] U.S. Cl. ............................ 280/12.1; 280/28.5
[51] Int. Cl.² ............................................ B62M 27/00
[58] Field of Search............ 280/12.1, 12.12, 12.14, 280/28.5

[56] References Cited
UNITED STATES PATENTS

| | | | |
|---|---|---|---|
| 1,318,166 | 10/1919 | Matteus | 280/12.1 |
| 1,450,466 | 4/1923 | Turnbull | 280/28.5 |
| 1,566,875 | 12/1925 | Jacobson | 280/12.1 |
| 2,466,222 | 4/1949 | Foner | 280/12.14 |

Primary Examiner—Philip Goodman
Attorney, Agent, or Firm—Howard I. Podell

[57] ABSTRACT

A vehicle for traveling on snow, the front end of which is mounted on a ski rotatably attached for steering to handlebars, with the rear end mounted on a flexible belt track mounted about a pair of wheels. One of the track wheels is joined by a drive chain to a pair of foot pedals.

2 Claims, 6 Drawing Figures

SNOW BIKE

SUMMARY OF THE INVENTION:

My invention relates to a bike adaptable for travelling on snow, and particularly to a bike which is mounted, in front, on a steerable ski, with the rear of the vehicle mounted on a flexible belt track mounted on a pair of wheels. The track is driven from a drive chain, powered by foot pedals.

BRIEF DESCRIPTION OF THE DRAWING:

The objects and features of the invention may be understood with reference to the following detailed description of an illustrative embodiment of the invention, taken together with the accompanying drawings in which.

Figure 1:
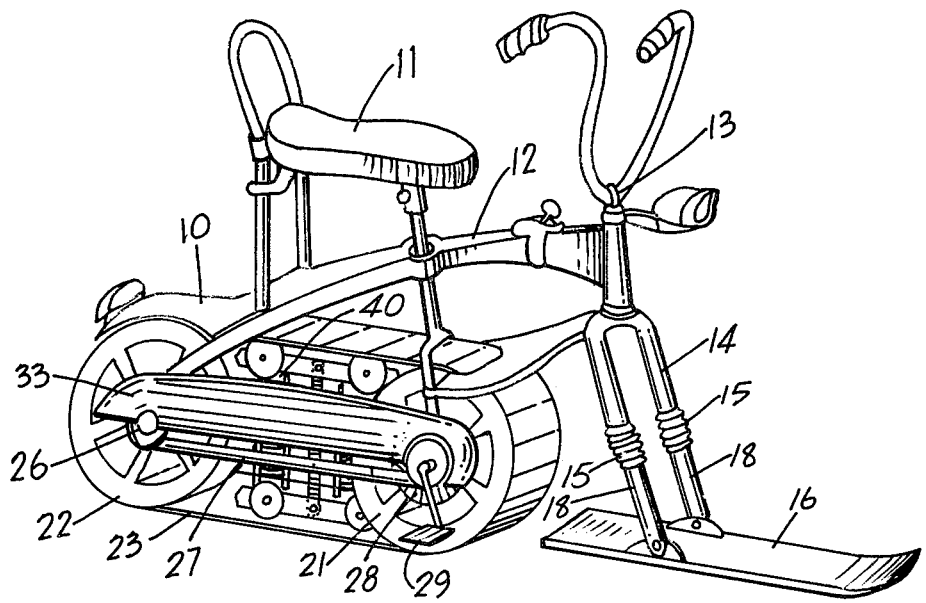
FIG. 1 is a perspective view of the invention.

DESCRIPTION OF THE PREFERRED EMBODIMENT:

Turning now descriptively to the drawings, in which similar reference characters denote similar elements throughout the several views, FIG. 1 illustrates the bike 10 with a saddle seat 11 mounted to the frame 12. Conventional handlebars 13 are mounted to a rotatably steering fork 14 that is joined by shock absorbers 15 on each fork leg to a ski 16, with the ski 16 hinged by pivot pins 17 to the two fork legs 18.

The rear of the frame 12 is mounted to two wheels 21 and 22 each aligned along the axis of the bike 10, with a flexible tracking belt 23 fitted about the wheels. The forward wheel 21 is mounted as an idler, with the rear wheel 22 mounted to the drive gear 26 of multispeed gear sprocket driven by a conventional chain belt 27 mounted about a pedal gear 28. Pedal gear 28 freely rotates about the axle of forward idler wheel 21 and is joined by an axle to conventional pedals 29. A mudguard 31 is mounted to the frame 12 above the top of the tracking belt 23 and extends over the rear wheel 22.

Figures 4, 5:
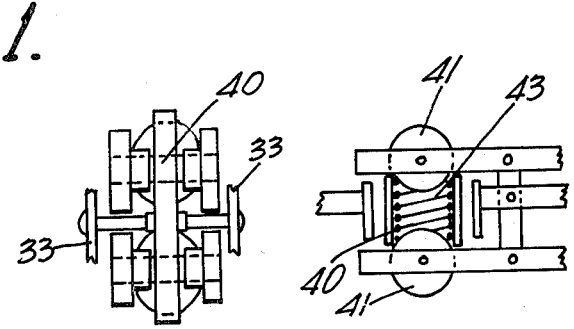
FIG. 4 is an end view of the compensating drive belt tension device.
FIG. 5 is a side view of the compensating drive belt tension device.
Figure 3:
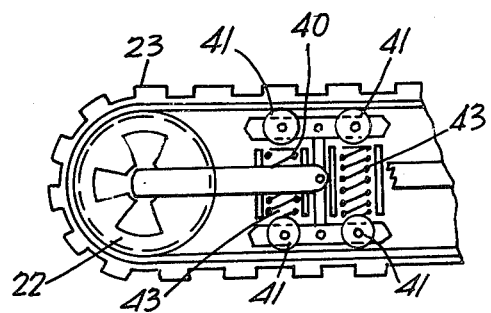
FIG. 3 is a fragmentary side view of the drive track belt mechanism.
Figure 6:
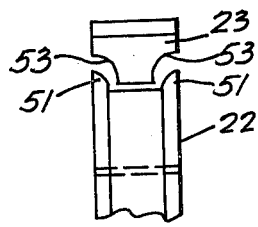
FIG. 6 is a fragmentary sectional view of the drive belt and drive belt wheel.

A frame member 33 joins the axles of wheels 22 and 21 and is fitted with a tensioner unit 40 that applies tension to the tracking belt 23 as shown in FIGS. 3–5. Tensioner unit 40 mounts pairs of idler wheels 41 against the opposing inside face of the track belt 23 with a compression spring 43 maintaining pressure against each pair of idler wheels.

Figure 2:
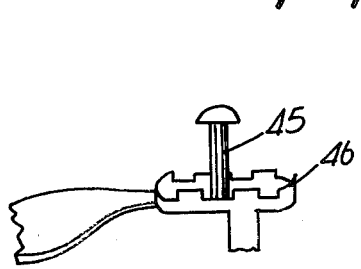
FIG. 2 is a fragmentary perspective view of the gear change lever.

As shown in FIGS. 1–2, a gear change lever 45 is mounted in a slotted socket 46 on the bike frame 12 for changing the ratio of drive gear 26.

Rear wheels 21 and 22 are fitted with rim flanges 51 for fitting about side recesses 53 of the tracking belt 23.

The vehicle may be fitted with a motor, with the motor output connected to the drive chain belt 27 to serve as an auxiliary or a sole source of driving power.

Since obvious changes may be made in the specific embodiment of the invention, described herein, such modifications being within the spirit and scope of the invention claimed, it is indicated that all matter contained herein is intended as illustrative and not as limiting in scope.

Having thus described the invention, what I claim as new and desire to secure by letters Patent of the U.S. is:

1. A vehicle for riding on snow comprising a frame on which a saddle seat is mounted, a forward steering fork rotatably fitted to the front of the frame, and a pair of wheels aligned along the frame axis at the rear of the frame, with the steering fork fitted at its upper end to a handlebar and mounted to pivotable pins to a ski on its lower end, and a flexible tracking belt mounted about the rims of the two rear wheels, the rearmost one of which is joined by a chain belt drive to a pedal sprocket fitted freely about the axle of the forward rear wheel, said pedal sprocket fitted with a pair of pedals.

2. The combination as recited in claim 1 in which tensioning means is mounted on a frame joining the axles of the two rear wheels, said tensioning means exerting spring pressure against the opposed inside faces of the sections of the tracking belt which are midway between the two rear wheels so as to also serve as shock absorbers to the bottommost section of the tracking belt.

* * * * *